US012460951B2

(12) United States Patent
Su

(10) Patent No.: US 12,460,951 B2
(45) Date of Patent: Nov. 4, 2025

(54) METHOD FOR DOOR LOCK CALIBRATION, DOOR LOCK, AND NON-TRANSITORY COMPUTER STORAGE MEDIUM

(71) Applicant: Shenzhen Kaadas Intelligent Technology Co., Ltd., Guangdong (CN)

(72) Inventor: Qiyun Su, Guangdong (CN)

(73) Assignee: SHENZHEN KAADAS INTELLIGENT TECHNOLOGY CO., LTD., Guangdong (CN)

( * ) Notice: Subject to any disclaimer, the term of this patent is extended or adjusted under 35 U.S.C. 154(b) by 499 days.

(21) Appl. No.: 17/987,143

(22) Filed: Nov. 15, 2022

(65) Prior Publication Data

US 2023/0152133 A1 May 18, 2023

(30) Foreign Application Priority Data

Nov. 17, 2021 (CN) ........................ 202111361395.4

(51) Int. Cl.
*G01D 18/00* (2006.01)
*E05B 47/00* (2006.01)
*G01D 5/12* (2006.01)

(52) U.S. Cl.
CPC ............... *G01D 18/00* (2013.01); *G01D 5/12* (2013.01); *E05B 47/0002* (2013.01); *E05B 2047/0068* (2013.01)

(58) Field of Classification Search
CPC ...... G01D 18/00; G01D 5/12; E05B 47/0002; E05B 2047/0068; E05C 19/166
See application file for complete search history.

(56) References Cited

U.S. PATENT DOCUMENTS

2015/0330140 A1 11/2015 Kincaid et al.
2016/0187368 A1 6/2016 Modi
(Continued)

FOREIGN PATENT DOCUMENTS

CN 102667412 A 9/2012
CN 104677266 A 6/2015
(Continued)

OTHER PUBLICATIONS

Office Action dated May 22, 2024 received in Canadian Patent Application No. 3,182,107.
(Continued)

*Primary Examiner* — Lee E Rodak
*Assistant Examiner* — Byung Ro Lee
(74) *Attorney, Agent, or Firm* — Scully, Scott, Murphy & Presser, P.C.

(57) ABSTRACT

A method for door lock calibration, a calibration apparatus, a door lock, and a non-transitory computer storage medium are provided. The method for door lock calibration includes the following. A first magnetic-field-intensity numerology at a position of a door in an ajar state, a second magnetic-field-intensity numerology at a position of the door in an open state, and a third magnetic-field-intensity numerology at a position of the door in a locked state are collected. A mapping relationship between the ajar state of the door and the first magnetic-field-intensity numerology, a mapping relationship between the open state of the door and the second magnetic-field-intensity numerology, and a mapping relationship between the locked state of the door and the third magnetic-field-intensity numerology are transmitted to a database.

15 Claims, 3 Drawing Sheets

(56) References Cited

U.S. PATENT DOCUMENTS

| | | | |
|---|---|---|---|
| 2016/0290005 A1 | 10/2016 | Goldenson | |
| 2019/0040653 A1* | 2/2019 | Baumgarte | E05B 47/0673 |
| 2020/0233053 A1 | 7/2020 | Vissiere et al. | |

FOREIGN PATENT DOCUMENTS

| | | | |
|---|---|---|---|
| CN | 108961777 | A | 12/2018 |
| CN | 109029228 | A | 12/2018 |
| CN | 109799083 | A | 5/2019 |
| CN | 211287074 | U | 8/2020 |
| CN | 112031543 | A | 12/2020 |
| CN | 112462089 | A | 3/2021 |
| CN | 112815826 | A | 5/2021 |
| CN | 113390440 | A | 9/2021 |
| EP | 2669627 | A1 | 12/2013 |
| WO | 2011141056 | A1 | 11/2011 |
| WO | 2014154738 | A1 | 10/2014 |
| WO | 2019121715 | A1 | 6/2019 |
| WO | 2019121717 | A1 | 6/2019 |

OTHER PUBLICATIONS

First Office Action dated Apr. 17, 2024 received in Chinese Patent Application No. 202111361395.4.
The Second Office Action issued in corresponding CN application No. 202111361395.4 dated Sep. 19, 2024.
Gao Xiang; Yan Shenggang; Li Bin;, "Study on the correction method of steering error of three-axis fluxgate magnetic gradiometer", Chinese Journal of Scientific Instrument, 06, dated Jun. 15, 2016.
Notice of allowance issued in corresponding CN application No. 202111361395.4 dated Feb. 18, 2025.

* cited by examiner

METHOD FOR DOOR LOCK CALIBRATION, DOOR LOCK, AND NON-TRANSITORY COMPUTER STORAGE MEDIUM

CROSS-REFERENCE TO RELATED APPLICATIONS

This application claims priority under 35 U.S.C. § 119(a) to Chinese Patent Application No. 2021113613954, filed Nov. 17, 2021, the entire disclosure of which is incorporated herein by reference.

TECHNICAL FIELD

This disclosure relates to the field of door lock technology, and more particularly to a method for door lock calibration, a door lock, and a non-transitory computer storage medium.

BACKGROUND

Magnetic-induction door locks refer to smart door locks equipped with geomagnetic sensors. On condition that a magnet is installed at a door frame, it can realize automatic detection of a current open state of a door if the door is open, and whether the door is in a locked state can be automatically detected if the door is closed.

Magnetic-induction door locks are prone to be affected by various factors such as an external magnetic field. The magnetic-induction door locks are prone to be interfered by various factors such as an external magnetic field when a state of the door is automatically detected, such that the magnetic-induction door locks cannot accurately detect whether the door is in the locked state. In this case, the magnetic-induction door locks are required to be re-calibrated. At present, manners for calibrating the magnetic-induction door locks are relatively complex, and thus it is difficult to calibrate the magnetic-induction door locks by those not skilled in the art.

SUMMARY

In a first aspect, a method for door lock calibration is provided in implementations of the disclosure. The method includes the following. A first magnetic-field-intensity numerology at a position of a door in an ajar state, a second magnetic-field-intensity numerology at a position of the door in an open state, and a third magnetic-field-intensity numerology at a position of the door in a locked state are collected. A mapping relationship between the ajar state of the door and the first magnetic-field-intensity numerology, a mapping relationship between the open state of the door and the second magnetic-field-intensity numerology, and a mapping relationship between the locked state of the door and the third magnetic-field-intensity numerology are transmitted to a database.

In a second aspect, a door lock is provided in implementations of the disclosure. The door lock includes a calibration apparatus and the calibration apparatus includes a sensor and a transmitter. The sensor is configured to collect a first magnetic-field-intensity numerology at a position of a door in an ajar state, a second magnetic-field-intensity numerology at a position of the door in an open state, and a third magnetic-field-intensity numerology at a position of the door in a locked state. The transmitter is configured to transmit to a database a mapping relationship between the ajar state of the door and the first magnetic-field-intensity numerology, a mapping relationship between the open state of the door and the second magnetic-field-intensity numerology, and a mapping relationship between the locked state of the door and the third magnetic-field-intensity numerology.

In a third aspect, a non-transitory computer storage medium is provided in implementations of the disclosure. The computer storage medium is configured to store computer instructions which, when executed by a processor, are operable with the processor to implement the method for door lock calibration described in the first aspect.

BRIEF DESCRIPTION OF THE DRAWINGS

To illustrate technical solutions of implementations of the disclosure more clearly, the following will give a brief introduction to accompanying drawings used for illustrating implementations. Apparently, the accompanying drawings hereinafter illustrated are some implementations of the disclosure. Based on these drawings, those of ordinary skill in the art can also obtain other drawings without creative effort.

DETAILED DESCRIPTION

The following will illustrate implementations of the disclosure with reference to accompanying drawings in implementations of the disclosure.

The terms "include", "comprise", and "have" as well as any variations used in a specification, claims, and the accompany drawings of the disclosure are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or characteristic illustrated in conjunction with implementations may be contained in at least one implementation of the disclosure. The phrase appearing in various places in the specification does not necessarily refer to a same implementation, nor does it refer to an independent implementation that is mutually exclusive with other implementations or an alternative implementation. It is explicitly and implicitly understood by those skilled in the art that implementations illustrated herein may be combined with other implementations.

Magnetic-induction door locks are prone to be affected by various factors such as an external magnetic field. The magnetic-induction door locks are prone to be interfered by various factors such as an external magnetic field when a state of the door is automatically detected, such that the magnetic-induction door locks cannot accurately detect whether the door is in a locked state. In this case, the magnetic-induction door locks are required to be re-calibrated. At present, manners for calibrating the magnetic-induction door locks are relatively complex, and thus it is difficult to calibrate the magnetic-induction door locks by those not skilled in the art.

Figure 1:
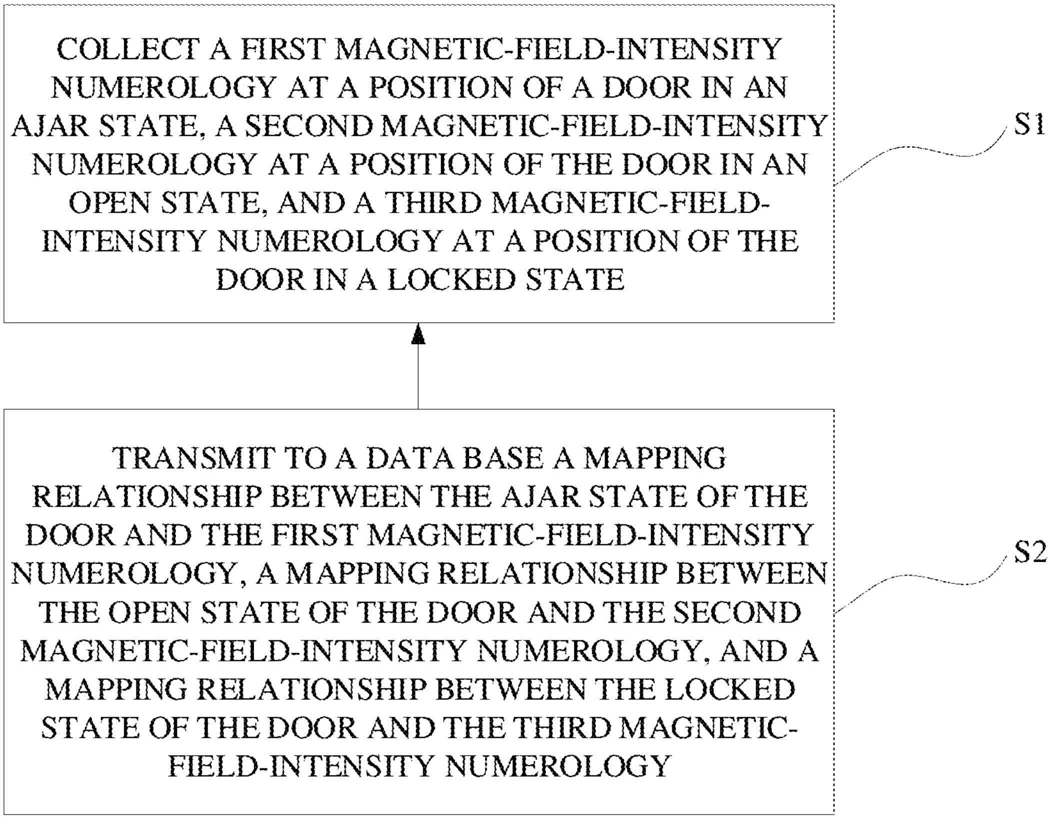
FIG. 1 is a schematic flow chart illustrating a method for door lock calibration provided in implementations of the disclosure.

A method for door lock calibration is provided in the disclosure. Referring to FIG. 1, the method includes, but is not limited to, operations at S1 and S2.

S1, a first magnetic-field-intensity numerology at a position of a door in an ajar state, a second magnetic-field-intensity numerology at a position of the door in an open state, and a third magnetic-field-intensity numerology at a position of the door in a locked state are collected.

Specifically, the first magnetic-field-intensity numerology, the second magnetic-field-intensity numerology, and the third magnetic-field-intensity numerology may be collected by a sensor, such as a magnetic sensor, geomagnetic sensor, etc.

The method for door lock calibration provided in the disclosure is applied to calibrate a magnetic-induction door lock. The magnetic-induction door lock includes a strong magnet and a magnetic sensor 110, where the strong magnet can be installed on a door frame, and the magnetic sensor 110 can be installed on a door. The strong magnet can provide a magnetic field, and the magnetic sensor 110 can sense a change of a magnetic field intensity of the door from opening to closing.

In implementations provided in the disclosure, states of the door are classified into three categories, and the three categories are an ajar state, an open state, and a locked state, where the ajar state refers to a state between the locked state and the open state of the door.

When the door is in the ajar state, the magnetic sensor 110 can collect the first magnetic-field-intensity numerology at the position of the door in the ajar state. The first magnetic-field-intensity numerology may contain only one first magnetic-field-intensity parameter and may also contain multiple first magnetic-field-intensity parameters, where each first magnetic-field-intensity parameter corresponds to an ajar position of the door in the ajar state.

When the door is in the open state, the magnetic sensor 110 can collect the second magnetic-field-intensity numerology at the position of the door in the open state. The second magnetic-field-intensity numerology may contain multiple second magnetic-field-intensity parameters, where each second magnetic-field-intensity parameter corresponds to an open position of the door in the open state.

When the door is in the locked state, the magnetic sensor 110 can collect the third magnetic-field-intensity numerology at the position of the door in the locked state. The third magnetic-field-intensity numerology may contain only one third magnetic-field-intensity parameter and may also contain multiple third magnetic-field-intensity parameters, where each third magnetic-field-intensity parameter corresponds to a lock position of the door in the locked state.

S2, a mapping relationship between the ajar state of the door and the first magnetic-field-intensity numerology, a mapping relationship between the open state of the door and the second magnetic-field-intensity numerology, and a mapping relationship between the locked state of the door and the third magnetic-field-intensity numerology are transmitted to a database.

Specifically, mapping relationships can be transmitted to a database by a transmitter.

As mentioned above, each first magnetic-field-intensity parameter corresponds to an ajar position of the door in the ajar state, each second magnetic-field-intensity parameter corresponds to an open position of the door in the open state, and each third magnetic-field-intensity parameter corresponds to a lock position of the door in the locked state. It can be understood that, there exist the mapping relationship between the ajar state of the door and the first magnetic-field-intensity numerology, the mapping relationship between the open state of the door and the second magnetic-field-intensity numerology, and the mapping relationship between the locked state of the door and the third magnetic-field-intensity numerology.

In implementations provided in the disclosure, the mapping relationship between the ajar state of the door and the first magnetic-field-intensity numerology, the mapping relationship between the open state of the door and the second magnetic-field-intensity numerology, and the mapping relationship between the locked state of the door and the third magnetic-field-intensity numerology are stored into the database. As such, the magnetic sensor 110 obtains a magnetic-field-intensity parameter at a position of the door when determining the state of the door, and by comparing the magnetic-field-intensity parameter with the first magnetic-field-intensity numerology, the second magnetic-field-intensity numerology, and the third magnetic-field-intensity numerology that are stored in the database, an approximate position of the door can be determined, and thus which state of the door can be determined among the ajar state, the open state, or the locked state.

Collecting the first magnetic-field-intensity numerology at the position of the door in the ajar state includes the following. At least one ajar position of the door in the ajar state from a first extreme position to a second extreme position and at least one first magnetic-field-intensity parameter corresponding to the at least one ajar position are collected. A mapping relationship between the at least one ajar position collected and the at least one first magnetic-field-intensity parameter collected is recorded. The ajar state corresponds to only one ajar position on condition that the first extreme position and the second extreme position are a same ajar position. Collecting the second magnetic-field-intensity numerology at the position of the door in the open state includes the following. A plurality of open positions of the door in the open state from a third extreme position to a fourth extreme position and second magnetic-field-intensity parameters corresponding to the plurality of open positions are collected. A mapping relationship between the plurality of open positions collected and the second magnetic-field-intensity parameters collected is recorded. Collecting the third magnetic-field-intensity numerology at the position of the door in the locked state includes the following. At least one lock position of the door in the locked state from a fifth extreme position to a sixth extreme position and at least one third magnetic-field-intensity parameter corresponding to the at least one lock position are collected. A mapping relationship between the at least one lock position collected and the at least one third magnetic-field-intensity parameter collected is recorded. The locked state corresponds to only one lock position on condition that the fifth extreme position and the sixth extreme position are a same lock position. Specifically, the first extreme position and the second extreme position are extreme positions of the door in the ajar state, when the door does not reach the second extreme position or cross the second extreme position, the door is not in the ajar state. The third extreme position and the fourth extreme position are extreme positions of the door in the open state, when the door does not reach the third extreme position or cross the fourth extreme position, the door is not in the open state. The fifth extreme position and the seventh extreme position are extreme positions of the door in the open state, when the door does not reach the fifth extreme position or cross the sixth extreme position, the door is not in the locked state.

In implementations provided in the disclosure, recording the mapping relationship between the at least one ajar position collected and the at least one first magnetic-field-intensity parameter collected includes the following. A first magnetic-field-intensity parameter at an ajar position collected and a first magnetic-field-intensity parameter at an ajar position collected last time are compared, on condition that the first extreme position and the second extreme position are different ajar positions. The ajar position collected this time and the first magnetic-field-intensity parameter collected this time are filtered out, on condition that a change between the first magnetic-field-intensity parameter at the ajar position collected this time and the first magnetic-field-intensity parameter at the ajar position collected last time is less than a first threshold. Changes are obtained by comparing the first magnetic-field-intensity parameter at the ajar position collected this time and first magnetic-field-intensity parameters of ajar positions collected previously, on condition that the change between the first magnetic-field-intensity parameter at the ajar position collected this time and the first magnetic-field-intensity parameter at the ajar position collected last time is greater than a second threshold, and the ajar position collected this time and the first magnetic-field-intensity parameter collected this time are filtered out on condition that one of the changes is less than the first threshold. It can be understood that the second threshold is larger than the first threshold, and the first magnetic-field-intensity parameters of ajar positions collected previously may not include the first magnetic-field-intensity parameter of the ajar position collected last time.

In implementations provided in the disclosure, the first extreme position and the second extreme position may be a same ajar position. When the first magnetic-field-intensity numerology at the position of the door in the ajar state is collected, the door is moved from the first extreme position to the second extreme position, and a first magnetic-field-intensity parameter at each ajar position of the door moving from the first extreme position to the second extreme position is collected. To avoid that ajar positions collected are too centralized, in the disclosure, a change is obtained by comparing the first magnetic-field-intensity parameter at the ajar position collected and a first magnetic-field-intensity parameter at an ajar position collected last time, and the ajar position collected this time and the first magnetic-field-intensity parameter collected this time are filtered out on condition that the change is less than the first threshold.

Recording the mapping relationship between the plurality of open positions collected and the second magnetic-field-intensity parameters collected includes the following. A second magnetic-field-intensity parameter at an open position collected and a second magnetic-field-intensity parameter at an open position collected last time are compared. The open position collected this time and the second magnetic-field-intensity parameter collected this time are filtered out, on condition that a change between the second magnetic-field-intensity parameter at the open position collected this time and the second magnetic-field-intensity parameter at the open position collected last time is less than a third threshold. Changes are obtained by comparing the second magnetic-field-intensity parameter at the open position collected this time and second magnetic-field-intensity parameters of open positions collected previously, on condition that the change between the second magnetic-field-intensity parameter at the open position collected this time and the second magnetic-field-intensity parameter at the open position collected last time is greater than a fourth threshold, and the open position collected this time and the second magnetic-field-intensity parameter collected this time are filtered out on condition that one of the changes is less than the third threshold. It can be understood that the fourth threshold is larger than the third threshold, and the first magnetic-field-intensity parameters of ajar positions collected previously may not include the first magnetic-field-intensity parameter of the ajar position collected last time.

In implementations provided in the disclosure, the door in the open state has the third extreme position and the fourth extreme position. Generally, the third extreme position and the fourth extreme position are different positions, and the third extreme position can be the same position as the second extreme position of the door in the ajar state.

When each open position of the door in the open state is collected, the door is moved slowly from the third extreme position to the fourth extreme position. In the process of moving the door, the magnetic sensor 110 collects an open position to which the door is moved and a second magnetic-field-intensity parameter corresponding to the open position.

In the process of the door moving slowly from the third extreme position to the fourth extreme position, to avoid that open positions recorded are too centralized, the second magnetic-field-intensity parameter at the open position collected and a second magnetic-field-intensity parameter at an open position collected last time are compared. If a change is less than the third threshold by comparing the second magnetic-field-intensity parameter corresponding to the open position collected this time and the second magnetic-field-intensity parameter at the open position collected last time, the open position collected this time and the second magnetic-field-intensity parameter corresponding to the open position collected this time are filtered out.

In implementations provided in the disclosure, in the process of the door moving slowly from the third extreme position to the fourth extreme position, the door may swing back and forth, such that positions of the door sensed by the magnetic sensor 110 may be repeated. If the door swings back and forth slightly, the magnetic sensor 110 collects an open position of the door swinging back and forth and a second magnetic-field-intensity parameter corresponding to the open position. Since the door swings back and forth slightly, the open position collected this time is relative close to a previous open position collected before the door swings, a change between the second magnetic-field-intensity parameter corresponding to the open position of the door swinging back and forth and a second magnetic-field-intensity parameter corresponding to the previous open position collected before the door swings may be slight, and the open position collected this time and the second magnetic-field-intensity parameter corresponding to the open position may be filtered out. If the door swings back and forth more widely, a second magnetic-field-intensity parameter corresponding to an open position collected this time and second magnetic-field-intensity parameters of all open positions collected previously are compared, and the open position collected this time and the second magnetic-field-intensity parameter corresponding to the open position are filtered out on condition that one of the all open positions collected previously is relative close to the open position collected this time.

Recording the mapping relationship between the plurality of open positions collected and the second magnetic-field-intensity parameters collected includes the following. A third magnetic-field-intensity parameter at a lock position collected and a third magnetic-field-intensity parameter at a lock position collected last time are compared, on condition that the fifth extreme position and the sixth extreme position are different lock positions. The lock position collected this time and the third magnetic-field-intensity parameter collected this time are filtered out, on condition that a change between the third magnetic-field-intensity parameter at the lock position collected this time and the third magnetic-field-intensity parameter at the lock position collected last time is less than a fifth threshold. Changes are obtained by comparing the third magnetic-field-intensity parameter at the lock position collected this time and third magnetic-field-intensity parameters of lock positions collected previously, on condition that the change between the third magnetic-field-intensity parameter at the lock position collected this time and the third magnetic-field-intensity parameter at the lock position collected last time is greater than a sixth threshold, and the lock position collected this time and the third magnetic-field-intensity parameter collected this time are filtered out on condition that one of the changes is less than the fifth threshold. It can be understood that the sixth threshold is larger than the fifth threshold, and the first magnetic-field-intensity parameters of ajar positions collected previously may not include the first magnetic-field-intensity parameter of the ajar position collected last time.

In implementations provided in the disclosure, the fifth extreme position and the sixth extreme position may be different lock positions and may also be a same lock position.

The fifth extreme position and the sixth extreme position may be different lock positions, and the magnetic sensor 110 collects each lock position of the door in the locked state when the door is moved from the fifth extreme position to the sixth extreme position.

A process that the magnetic sensor 110 collects each lock position of the door in the locked state is similar to the process that the magnetic sensor 110 collects each open position of the door in the open state, which is not be repeated herein.

The first magnetic-field-intensity parameter, the second magnetic-field-intensity parameter, and the third magnetic-field-intensity parameter each comprises three sub-parameters in three directions. Specifically, the first magnetic-field-intensity parameter includes a first directional sub-parameter, a second directional sub-parameter, and a third directional sub-parameter. The second magnetic-field-intensity parameter includes a fourth directional sub-parameter, a fifth directional sub-parameter, and a sixth directional sub-parameter. The third magnetic-field-intensity parameter includes s a seventh directional sub-parameter, an eighth directional sub-parameter, and a ninth directional sub-parameter.

In implementations provided in the disclosure, directions of the first directional sub-parameter, the second directional sub-parameter, and the third directional sub-parameter of the first magnetic-field-intensity parameter can be indicated through X axis, Y axis, and Z axis. Exemplarily, the X axis, the Y axis, and the Z axis correspond to the first directional sub-parameter, the second directional sub-parameter, and the third directional sub-parameter, respectively.

Directions of the fourth directional sub-parameter, the fifth directional sub-parameter, and the sixth directional sub-parameter of the second magnetic-field-intensity parameter can be indicated through the X axis, the Y axis, and the Z axis. Exemplarily, the X axis, the Y axis, and the Z axis correspond to the fourth directional sub-parameter, the fifth directional sub-parameter, and the sixth directional sub-parameter, respectively.

Directions of the seventh directional sub-parameter, the eighth directional sub-parameter, and the ninth directional sub-parameter of the third magnetic-field-intensity parameter can be indicated through the X axis, the Y axis, and the Z axis. Exemplarily, the X axis, the Y axis, and the Z axis correspond to the seventh directional sub-parameter, the eighth directional sub-parameter, and the ninth directional sub-parameter, respectively.

Figure 2:
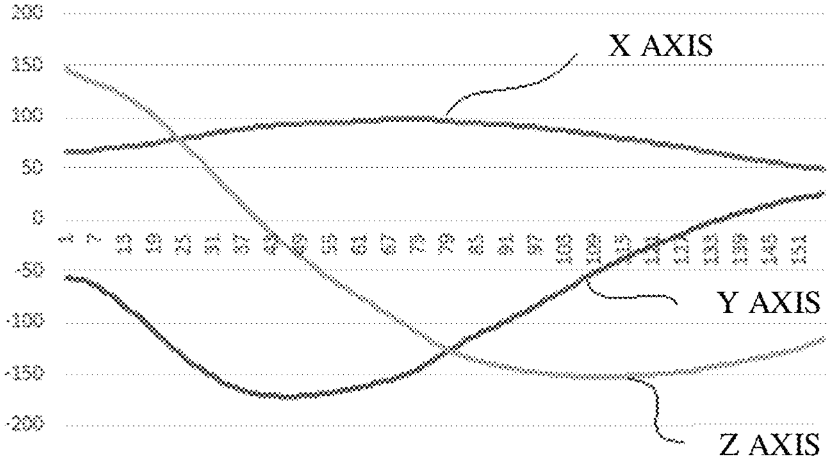
FIG. 2 is a line chart illustrating a magnetic-field-intensity parameter in X axis, Y axis, and Z axis of a door from a first extreme position to a sixth extreme position collected by a magnetic sensor provided in implementations of the disclosure.

Specifically referring to FIG. 2, FIG. 2 is a schematic line chart illustrating a magnetic-field-intensity parameter in three directions of X axis, Y axis, and Z axis of a door from a first extreme position to a sixth extreme position collected by a magnetic sensor 110.

Recording the mapping relationship between the at least one ajar position collected and the at least one first magnetic-field-intensity parameter collected includes the following. A change trend of the at least one first magnetic-field-intensity parameter during movement of the door from the first extreme position to the second extreme position is obtained. For an ajar position collected, on condition that two or more of a first directional sub-parameter, a second directional sub-parameter, and a third directional sub-parameter of a first magnetic-field-intensity parameter corresponding to the ajar position collected are not satisfied with the change trend of the at least one first magnetic-field-intensity parameter, the ajar position collected this time and the first magnetic-field-intensity parameter collected this time are filtered out. Recording the mapping relationship between the plurality of open positions collected and the second magnetic-field-intensity parameters collected includes the following. A change trend of the second magnetic-field-intensity parameters during movement of the door from the third extreme position to the fourth extreme position is obtained. For an open position collected, on condition that two or more of a fourth directional sub-parameter, a fifth directional sub-parameter, and a sixth directional sub-parameter of a second magnetic-field-intensity parameter corresponding to the open position collected are not satisfied with the change trend of the second magnetic-field-intensity parameter, the open position collected this time and the second magnetic-field-intensity parameter collected this time are filtered out. Recording the mapping relationship between the at least one lock position collected and the at least one third magnetic-field-intensity parameter collected includes the following. A change trend of the at least one third magnetic-field-intensity parameter during movement of the door from the fifth extreme position to the sixth extreme position is obtained. For a lock position collected, on condition that two or more of a seventh directional sub-parameter, an eighth directional sub-parameter, and a ninth directional sub-parameter of a third magnetic-field-intensity parameter corresponding to the lock position collected are not satisfied with the change trend of the at least one third magnetic-field-intensity parameter, the lock position collected this time and the third magnetic-field-intensity parameter collected this time are filtered out.

In implementations provided in the disclosure, before collecting positions of the door in the ajar state, the open state, and the locked state, positions of the door in the ajar state, the open state, and the locked state can be pre-collected, to approximately determine two ends (the first extreme position and the second extreme position are different positions) of the first magnetic-field-intensity parameters corresponding to the door in the ajar state, two ends of the second magnetic-field-intensity parameters corresponding to the door in the open state, and two ends (the fifth extreme position and the sixth extreme position are different positions) of the third magnetic-field-intensity parameters corresponding to the door in the locked state, and thus a change trend of the first magnetic-field-intensity parameters during movement of the door from the first extreme position to the second extreme position, a change trend of the second magnetic-field-intensity parameters during movement of the door from the third extreme position to the fourth extreme position, and a change trend of the third magnetic-field-intensity parameters during movement of the door from the fifth extreme position to the sixth extreme position can be determined.

Specifically, when the magnetic sensor 110 collects the first magnetic-field-intensity parameter corresponding to the door in the ajar state, it can be determined that whether a first directional sub-parameter, a second directional sub-parameter, and a third directional sub-parameter at an ajar position collected in real time are satisfied with the change trend of the first magnetic-field-intensity parameter during movement of the door from the first extreme position to the second extreme position.

Similarly, specifically, when the magnetic sensor 110 collects the second magnetic-field-intensity parameter corresponding to the door in the open state, it can be determined that whether a fourth directional sub-parameter, a fifth directional sub-parameter, and a sixth directional sub-parameter at an open position collected in real time are satisfied with the change trend of the second magnetic-field-intensity parameter during movement of the door from the third extreme position to the fourth extreme position.

Similarly, specifically, when the magnetic sensor 110 collects the third magnetic-field-intensity parameter corresponding to the door in the locked state, it can be determined that whether a seventh directional sub-parameter, an eighth directional sub-parameter, and a ninth directional sub-parameter of an lock position collected in real time are satisfied with the change trend of the third magnetic-field-intensity parameter during movement of the door from the fifth extreme position to the sixth extreme position.

The method further includes the following. A first validation magnetic-field-intensity parameter corresponding to the position of the door in the ajar state is obtained. Whether the first validation magnetic-field-intensity parameter is in an interval ranging from a minimum first magnetic-field-intensity parameter in the first magnetic-field-intensity numerology to a maximum first magnetic-field-intensity parameter in the first magnetic-field-intensity numerology is determined, and if no, first validation magnetic-field-intensity parameters that respectively correspond to a plurality of positions of the door in the ajar state are collected, first deviations are determined by comparing the first validation magnetic-field-intensity parameters that correspond to the plurality of positions and first magnetic-field-intensity parameters in the first magnetic-field-intensity numerology respectively, and each first magnetic-field-intensity parameter in the first magnetic-field-intensity numerology is re-adjusted according to a corresponding first deviation. A second validation magnetic-field-intensity parameter corresponding to the position of the door in the open state is obtained. Whether the second validation magnetic-field-intensity parameter is in an interval ranging from a minimum second magnetic-field-intensity parameter in the second magnetic-field-intensity numerology to a maximum second magnetic-field-intensity parameter in the second magnetic-field-intensity numerology is determined, and if no, second validation magnetic-field-intensity parameters that respectively correspond to a plurality of positions of the door in the open state are collected, second deviations are determined by comparing the second validation magnetic-field-intensity parameters that correspond to the plurality of positions and second magnetic-field-intensity parameters in the second magnetic-field-intensity numerology respectively, and each second magnetic-field-intensity parameter in the second magnetic-field-intensity numerology is re-adjusted according to a corresponding second deviation. A third validation magnetic-field-intensity parameter corresponding to the position of the door in the locked state is obtained. Whether the third validation magnetic-field-intensity parameter is in an interval ranging from a minimum third magnetic-field-intensity parameter in the third magnetic-field-intensity numerology to a maximum third magnetic-field-intensity parameter in the third magnetic-field-intensity numerology is determined, and if no, third validation magnetic-field-intensity parameters that respectively correspond to a plurality of positions of the door in the locked state are collected, third deviations are determined by comparing the third validation magnetic-field-intensity parameters that correspond to the plurality of positions and third magnetic-field-intensity parameters in the third magnetic-field-intensity numerology respectively, and each third magnetic-field-intensity parameter in the third magnetic-field-intensity numerology is re-adjusted according to a corresponding third deviation.

Figure 3:
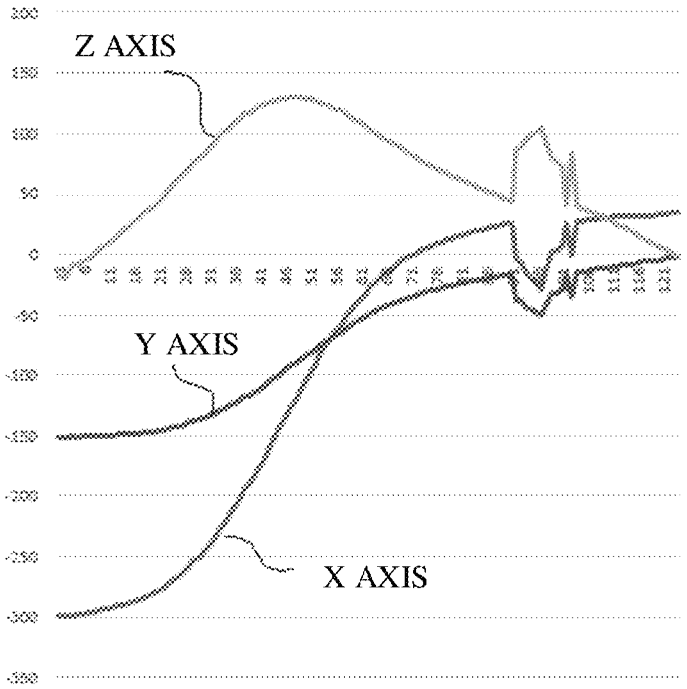
FIG. 3 is a line chart illustrating a magnetic-field-intensity parameter in X axis, Y axis, and Z axis of a door from a first extreme position to a sixth extreme position under interference of an external magnetic field collected by a magnetic sensor provided in implementations of the disclosure.

In implementations provided in the disclosure, the magnetic sensor 110 is prone to be interfered by an external magnetic field, which easily causes wrong determination when the state of the door is determined. Refer to FIG. 3, which is a line chart illustrating a magnetic-field-intensity parameter in X axis, Y axis, and Z axis of a door from a first extreme position to a sixth extreme position under interference of an external magnetic field collected by a magnetic sensor provided in implementations of the disclosure. If the magnetic sensor 110 is interfered by the external magnetic field, positions of the door in the ajar state, positions of the door in the open state, and positions of the door in the locked state are collected, interference rules are obtained by performing conversion, and each of the first magnetic-field-intensity numerology, the second magnetic-field-intensity numerology, and the third magnetic-field-intensity numerology are updated according to a corresponding interference rule.

In implementations provided in the disclosure, after obtaining the interference rules and before updating each of the first magnetic-field-intensity numerology, the second magnetic-field-intensity numerology, and the third magnetic-field-intensity numerology according to the corresponding interference rule, several positions of the door can also be collected to verify the interference rules. If the verification succeeds, each of the first magnetic-field-intensity numerology, the second magnetic-field-intensity numerology, and the third magnetic-field-intensity numerology are updated according to the corresponding interference rule.

Figure 4:
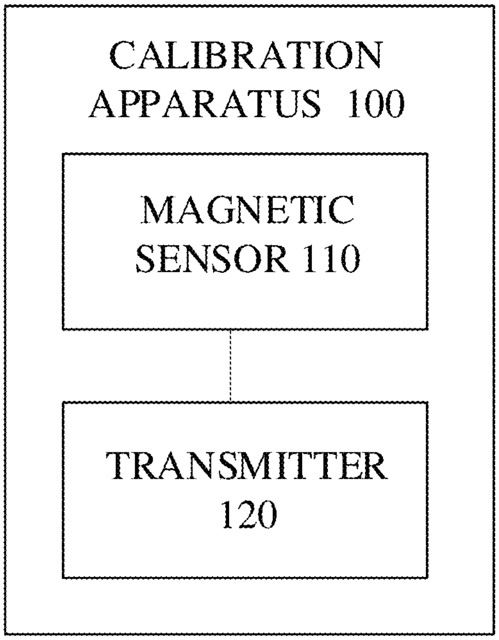
FIG. 4 is a structural block diagram illustrating a calibration apparatus provided in implementations of the disclosure.

A calibration apparatus is provided in implementations of the disclosure. Referring to FIG. 4, a calibration apparatus 100 includes a magnetic sensor 110 and a transmitter 120. The magnetic sensor 110 is configured to collect a first magnetic-field-intensity numerology at a position of a door in an ajar state, a second magnetic-field-intensity numerology at a position of the door in an open state, and a third magnetic-field-intensity numerology at a position of the door in a locked state. The transmitter 120 is configured to transmit to a database a mapping relationship between the ajar state of the door and the first magnetic-field-intensity numerology, a mapping relationship between the open state of the door and the second magnetic-field-intensity numerology, and a mapping relationship between the locked state of the door and the third magnetic-field-intensity numerology.

Figure 5:
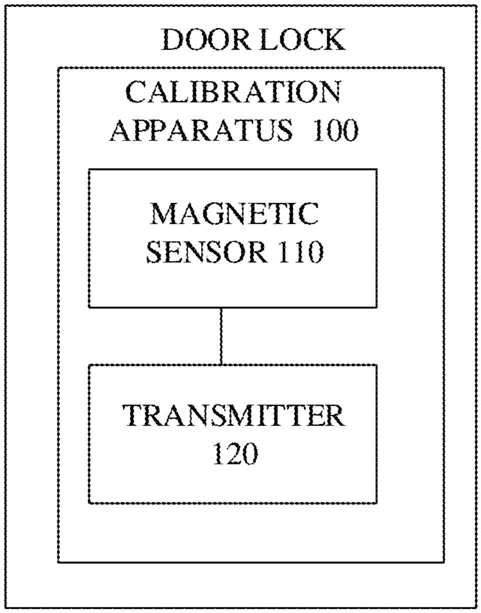
FIG. 5 is a structural block diagram illustrating a door lock provided in implementations of the disclosure.

A door lock is provided in implementations of the disclosure as illustrated in FIG. 5. The door lock has the above calibration apparatus 100.

A non-transitory computer storage medium is provided in implementations of the disclosure. The computer storage medium is configured to store computer instructions which, when executed by a processor, are operable with the processor to implement the above method.

As mentioned above, the above are only specific implementations of the disclosure and are not intended to limit the scope of protection of the disclosure. Any modification and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for door lock calibration, performed by a calibration apparatus comprising a sensor and a transmitter, the method comprising:

collecting, by the sensor, a first magnetic-field-intensity numerology at a position of a door in an ajar state, a second magnetic-field-intensity numerology at a position of the door in an open state, and a third magnetic-field-intensity numerology at a position of the door in a locked state; and transmitting, by the transmitter, to a database, a mapping relationship between the ajar state of the door and the first magnetic-field-intensity numerology, a mapping relationship between the open state of the door and the second magnetic-field-intensity numerology, and a mapping relationship between the locked state of the door and the third magnetic-field-intensity numerology;

wherein the first magnetic-field-intensity numerology contains at least one first magnetic-field-intensity parameter, and each of the at least one first magnetic-field-intensity parameter corresponds to an ajar position of the door in the ajar state;

the second magnetic-field-intensity numerology contains at least one second magnetic-field-intensity parameter, and each of the at least one second magnetic-field-intensity parameter corresponds to an open position of the door in the open state; and the third magnetic-field-intensity numerology contains at least one third magnetic-field-intensity parameter, and each of the at least one third magnetic-field-intensity parameter corresponds to a lock position of the door in the locked state;

wherein the method further comprises:

obtaining, by the sensor, a first validation magnetic-field-intensity parameter corresponding to the position of the door in the ajar state;

determining, by the sensor, whether the first validation magnetic-field-intensity parameter is in an interval ranging from a minimum first magnetic-field-intensity parameter in the first magnetic-field-intensity numerology to a maximum first magnetic-field-intensity parameter in the first magnetic-field-intensity numerology, and if no, collecting, by the sensor, first validation magnetic-field-intensity parameters that respectively correspond to a plurality of positions of the door in the ajar state, determining, by the sensor, first deviations by comparing the first validation magnetic-field-intensity parameters that correspond to the plurality of positions and first magnetic-field-intensity parameters in the first magnetic-field-intensity numerology respectively, and re-adjusting, by the sensor, each first magnetic-field-intensity parameter in the first magnetic-field-intensity numerology according to a corresponding first deviation;

obtaining, by the sensor, a second validation magnetic-field-intensity parameter corresponding to the position of the door in the open state;

determining, by the sensor, whether the second validation magnetic-field-intensity parameter is in an interval ranging from a minimum second magnetic-field-intensity parameter in the second magnetic-field-intensity numerology to a maximum second magnetic-field-intensity parameter in the second magnetic-field-intensity numerology, and if no, collecting, by the sensor, second validation magnetic-field-intensity parameters that respectively correspond to a plurality of positions of the door in the open state, determining, by the sensor, second deviations by comparing the second validation magnetic-field-intensity parameters that correspond to the plurality of positions and second magnetic-field-intensity parameters in the second magnetic-field-intensity numerology respectively, and re-adjusting, by the sensor, each second magnetic-field-intensity parameter in the second magnetic-field-intensity numerology according to a corresponding second deviation;

obtaining, by the sensor, a third validation magnetic-field-intensity parameter corresponding to the position of the door in the locked state; and determining, by the sensor, whether the third validation magnetic-field-intensity parameter is in an interval ranging from a minimum third magnetic-field-intensity parameter in the third magnetic-field-intensity numerology to a maximum third magnetic-field-intensity parameter in the third magnetic-field-intensity numerology, and if no, collecting, by the sensor, third validation magnetic-field-intensity parameters that respectively correspond to a plurality of positions of the door in the locked state, determining, by the sensor, third deviations by comparing the third validation magnetic-field-intensity parameters that correspond to the plurality of positions and third magnetic-field-intensity parameters in the third magnetic-field-intensity numerology respectively, and re-adjusting, by the sensor, each third magnetic-field-intensity parameter in the third magnetic-field-intensity numerology according to a corresponding third deviation.

2. The method for door lock calibration of claim 1, wherein collecting, by the sensor, the first magnetic-field-intensity numerology at the position of the door in the ajar state comprises:

collecting, by the sensor, at least one ajar position of the door in the ajar state from a first extreme position to a second extreme position and at least one first magnetic-field-intensity parameter corresponding to the at least one ajar position; and recording, by the sensor, a mapping relationship between the at least one ajar position collected and the at least one first magnetic-field-intensity parameter collected, wherein the ajar state corresponds to only one ajar position on condition that the first extreme position and the second extreme position are a same ajar position;

collecting, by the sensor, the second magnetic-field-intensity numerology at the position of the door in the open state comprises:

collecting, by the sensor, a plurality of open positions of the door in the open state from a third extreme position to a fourth extreme position and second magnetic-field-intensity parameters corresponding to the plurality of open positions; and recording, by the sensor, a mapping relationship between the plurality of open positions collected and the second magnetic-field-intensity parameters collected; and collecting, by the sensor, the third magnetic-field-intensity numerology at the position of the door in the locked state comprises:

collecting, by the sensor, at least one lock position of the door in the locked state from a fifth extreme position to a sixth extreme position and at least one third magnetic-field-intensity parameter corresponding to the at least one lock position; and recording, by the sensor, a mapping relationship between the at least one lock position collected and the at least one third magnetic-field-intensity parameter collected, wherein the locked state corresponds to only one lock position on condition that the fifth extreme position and the sixth extreme position are a same lock position.

3. The method for door lock calibration of claim 2, wherein recording, by the sensor, the mapping relationship between the at least one ajar position collected and the at least one first magnetic-field-intensity parameter collected comprises:

comparing, by the sensor, a first magnetic-field-intensity parameter at an ajar position currently collected and a first magnetic-field-intensity parameter at an ajar position previously collected, on condition that the first extreme position and the second extreme position are different ajar positions;

filtering out, by the sensor, the ajar position currently collected and the first magnetic-field-intensity parameter currently collected, on condition that a change between the first magnetic-field-intensity parameter at the ajar position currently collected and the first magnetic-field-intensity parameter at the ajar position previously collected is less than a first threshold; and obtaining, by the sensor, changes by comparing the first magnetic-field-intensity parameter at the ajar position currently collected and each of first magnetic-field-intensity parameters of ajar positions collected previously, on condition that the change between the first magnetic-field-intensity parameter at the ajar position currently collected and the first magnetic-field-intensity parameter at the ajar position previously collected is greater than a second threshold, and filtering out, by the sensor, the ajar position currently collected and the first magnetic-field-intensity parameter currently collected on condition that one of the changes is less than the first threshold;

recording, by the sensor, the mapping relationship between the plurality of open positions collected and the second magnetic-field-intensity parameters collected comprises:

comparing, by the sensor, a second magnetic-field-intensity parameter at an open position currently collected and a second magnetic-field-intensity parameter at an open position previously collected;

filtering out, by the sensor, the open position currently collected and the second magnetic-field-intensity parameter currently collected, on condition that a change between the second magnetic-field-intensity parameter at the open position currently collected and the second magnetic-field-intensity parameter at the open position previously collected is less than a third threshold;

obtaining, by the sensor, changes by comparing the second magnetic-field-intensity parameter at the open position currently collected and second magnetic-field-intensity parameters of open positions collected previously, on condition that the change between the second magnetic-field-intensity parameter at the open position currently collected and the second magnetic-field-intensity parameter at the open position previously collected is greater than a fourth threshold, and filtering out, by the sensor, the open position currently collected and the second magnetic-field-intensity parameter currently collected on condition that one of the changes is less than the third threshold;

recording, by the sensor, the mapping relationship between the plurality of lock positions collected and the third magnetic-field-intensity parameters collected comprises:

comparing, by the sensor, a third magnetic-field-intensity parameter at a lock position currently collected and a third magnetic-field-intensity parameter at a lock position previously collected, on condition that the fifth extreme position and the sixth extreme position are different lock positions;

filtering out, by the sensor, the lock position currently collected and the third magnetic-field-intensity parameter currently collected, on condition that a change between the third magnetic-field-intensity parameter at the lock position currently collected and the third magnetic-field-intensity parameter at the lock position previously collected is less than a fifth threshold; and obtaining, by the sensor, changes by comparing the third magnetic-field-intensity parameter at the lock position currently collected and third magnetic-field-intensity parameters of lock positions collected previously, on condition that the change between the third magnetic-field-intensity parameter at the lock position currently collected and the third magnetic-field-intensity parameter at the lock position previously collected is greater than a sixth threshold, and filtering out, by the sensor, the lock position currently collected and the third magnetic-field-intensity parameter currently collected on condition that one of the changes is less than the fifth threshold.

4. The method for door lock calibration of claim 1, wherein the first magnetic-field-intensity parameter, the second magnetic-field-intensity parameter, and the third magnetic-field-intensity parameter each comprises three sub-parameters in three directions.

5. The method for door lock calibration of claim 4, wherein recording, by the sensor, the mapping relationship between the at least one ajar position collected and the at least one first magnetic-field-intensity parameter collected comprises:

obtaining, by the sensor, a change trend of the at least one first magnetic-field-intensity parameter during movement of the door in the ajar state from a first extreme position to a second extreme position; and for an ajar position collected, on condition that two or more of a first directional sub-parameter, a second directional sub-parameter, and a third directional sub-parameter of a first magnetic-field-intensity parameter corresponding to the ajar position collected are not satisfied with the change trend of the at least one first magnetic-field-intensity parameter, filtering out, by the sensor, the ajar position currently collected and the first magnetic-field-intensity parameter currently collected;

recording, by the sensor, the mapping relationship between the plurality of open positions collected and the second magnetic-field-intensity parameters collected comprises:

obtaining, by the sensor, a change trend of the second magnetic-field-intensity parameters during movement of the door in the open state from a third extreme position to a fourth extreme position; and for an open position collected, on condition that two or more of a fourth directional sub-parameter, a fifth directional sub-parameter, and a sixth directional sub-parameter of a second magnetic-field-intensity parameter corresponding to the open position collected are not satisfied with the change trend of the second magnetic-field-intensity parameter, filtering out, by the sensor, the open position currently collected and the second magnetic-field-intensity parameter currently collected; and recording, by the sensor, the mapping relationship between the at least one lock position collected and the at least one third magnetic-field-intensity parameter collected comprises:

obtaining, by the sensor, a change trend of the at least one third magnetic-field-intensity parameter during movement of the door in the locked state from a fifth extreme position to a sixth extreme position; and for a lock position collected, on condition that two or more of a seventh directional sub-parameter, an eighth directional sub-parameter, and a ninth directional sub-parameter of a third magnetic-field-intensity parameter corresponding to the lock position collected are not satisfied with the change trend of the at least one third magnetic-field-intensity parameter, filtering out, by the sensor, the lock position currently collected and the third magnetic-field-intensity parameter currently collected.

6. A door lock, comprising a calibration apparatus, wherein the calibration apparatus comprises:

a sensor configured to collect a first magnetic-field-intensity numerology at a position of a door in an ajar state, a second magnetic-field-intensity numerology at a position of the door in an open state, and a third magnetic-field-intensity numerology at a position of the door in a locked state; and a transmitter configured to transmit to a database a mapping relationship between the ajar state of the door and the first magnetic-field-intensity numerology, a mapping relationship between the open state of the door and the second magnetic-field-intensity numerology, and a mapping relationship between the locked state of the door and the third magnetic-field-intensity numerology;

wherein the first magnetic-field-intensity numerology contains at least one first magnetic-field-intensity parameter, and each of the at least one first magnetic-field-intensity parameter corresponds to an ajar position of the door in the ajar state;

the second magnetic-field-intensity numerology contains at least one second magnetic-field-intensity parameter, and each of the at least one second magnetic-field-intensity parameter corresponds to an open position of the door in the open state; and the third magnetic-field-intensity numerology contains at least one third magnetic-field-intensity parameter, and each of the at least one third magnetic-field-intensity parameter corresponds to a lock position of the door in the locked state;

wherein the sensor is further configured to:

obtain a first validation magnetic-field-intensity parameter corresponding to the position of the door in the ajar state;

determine whether the first validation magnetic-field-intensity parameter is in an interval ranging from a minimum first magnetic-field-intensity parameter in the first magnetic-field-intensity numerology to a maximum first magnetic-field-intensity parameter in the first magnetic-field-intensity numerology, and if no, collect first validation magnetic-field-intensity parameters that respectively correspond to a plurality of positions of the door in the ajar state, determine first deviations by comparing the first validation magnetic-field-intensity parameters that correspond to the plurality of positions and first magnetic-field-intensity parameters in the first magnetic-field-intensity numerology respectively, and re-adjust each first magnetic-field-intensity parameter in the first magnetic-field-intensity numerology according to a corresponding first deviation;

obtain a second validation magnetic-field-intensity parameter corresponding to the position of the door in the open state;

determine whether the second validation magnetic-field-intensity parameter is in an interval ranging from a minimum second magnetic-field-intensity parameter in the second magnetic-field-intensity numerology to a maximum second magnetic-field-intensity parameter in the second magnetic-field-intensity numerology, and if no, collect second validation magnetic-field-intensity parameters that respectively correspond to a plurality of positions of the door in the open state, determine second deviations by comparing the second validation magnetic-field-intensity parameters that correspond to the plurality of positions and second magnetic-field-intensity parameters in the second magnetic-field-intensity numerology respectively, and re-adjust each second magnetic-field-intensity parameter in the second magnetic-field-intensity numerology according to a corresponding second deviation;

obtain a third validation magnetic-field-intensity parameter corresponding to the position of the door in the locked state; and determine whether the third validation magnetic-field-intensity parameter is in an interval ranging from a minimum third magnetic-field-intensity parameter in the third magnetic-field-intensity numerology to a maximum third magnetic-field-intensity parameter in the third magnetic-field-intensity numerology, and if no, collect third validation magnetic-field-intensity parameters that respectively correspond to a plurality of positions of the door in the locked state, determine third deviations by comparing the third validation magnetic-field-intensity parameters that correspond to the plurality of positions and third magnetic-field-intensity parameters in the third magnetic-field-intensity numerology respectively, and re-adjust each third magnetic-field-intensity parameter in the third magnetic-field-intensity numerology according to a corresponding third deviation.

7. The door lock of claim 6, wherein in terms of collecting the first magnetic-field-intensity numerology at the position of the door in the ajar state, the sensor is configured to:

collect at least one ajar position of the door in the ajar state from a first extreme position to a second extreme position and at least one first magnetic-field-intensity parameter corresponding to the at least one ajar position; and record a mapping relationship between the at least one ajar position collected and the at least one first magnetic-field-intensity parameter collected, wherein the ajar state corresponds to only one ajar position on condition that the first extreme position and the second extreme position are a same ajar position;

in terms of collecting the second magnetic-field-intensity numerology at the position of the door in the open state, the sensor is configured to:

collect a plurality of open positions of the door in the open state from a third extreme position to a fourth extreme position and second magnetic-field-intensity parameters corresponding to the plurality of open positions; and record a mapping relationship between the plurality of open positions collected and the second magnetic-field-intensity parameters collected; and in terms of collecting the third magnetic-field-intensity numerology at the position of the door in the locked state, the sensor is configured to:

collect at least one lock position of the door in the locked state from a fifth extreme position to a sixth extreme position and at least one third magnetic-field-intensity parameter corresponding to the at least one lock position; and record a mapping relationship between the at least one lock position collected and the at least one third magnetic-field-intensity parameter collected, wherein the locked state corresponds to only one lock position on condition that the fifth extreme position and the sixth extreme position are a same lock position.

8. The door lock of claim 7, wherein in terms of recording the mapping relationship between the at least one ajar position collected and the at least one first magnetic-field-intensity parameter collected, the sensor is configured to:

compare a first magnetic-field-intensity parameter at an ajar position currently collected and a first magnetic-field-intensity parameter at an ajar position previously collected, on condition that the first extreme position and the second extreme position are different ajar positions;

filter out the ajar position currently collected and the first magnetic-field-intensity parameter currently collected, on condition that a change between the first magnetic-field-intensity parameter at the ajar position currently collected and the first magnetic-field-intensity parameter at the ajar position previously collected is less than a first threshold; and obtain changes by comparing the first magnetic-field-intensity parameter at the ajar position currently collected and first magnetic-field-intensity parameters of ajar positions collected previously, on condition that the change between the first magnetic-field-intensity parameter at the ajar position currently collected and the first magnetic-field-intensity parameter at the ajar position previously collected is greater than a second threshold, and filter out the ajar position currently collected and the first magnetic-field-intensity parameter currently collected on condition that one of the changes is less than the first threshold;

in terms of recording the mapping relationship between the plurality of open positions collected and the second magnetic-field-intensity parameters collected, the sensor is configured to:

compare a second magnetic-field-intensity parameter at an open position currently collected and a second magnetic-field-intensity parameter at an open position previously collected;

filter out the open position currently collected and the second magnetic-field-intensity parameter currently collected, on condition that a change between the second magnetic-field-intensity parameter at the open position currently collected and the second magnetic-field-intensity parameter at the open position previously collected is less than a third threshold;

obtain changes by comparing the second magnetic-field-intensity parameter at the open position currently collected and second magnetic-field-intensity parameters of open positions collected previously, on condition that the change between the second magnetic-field-intensity parameter at the open position currently collected and the second magnetic-field-intensity parameter at the open position previously collected is greater than a fourth threshold, and filter out the open position currently collected and the second magnetic-field-intensity parameter currently collected on condition that one of the changes is less than the third threshold;

in terms of recording the mapping relationship between the plurality of lock positions collected and the third magnetic-field-intensity parameters collected, the sensor is configured to:

compare a third magnetic-field-intensity parameter at a lock position currently collected and a third magnetic-field-intensity parameter at a lock position previously collected, on condition that the fifth extreme position and the sixth extreme position are different lock positions;

filter out the lock position currently collected and the third magnetic-field-intensity parameter currently collected, on condition that a change between the third magnetic-field-intensity parameter at the lock position currently collected and the third magnetic-field-intensity parameter at the lock position previously collected is less than a fifth threshold; and obtain changes by comparing the third magnetic-field-intensity parameter at the lock position currently collected and third magnetic-field-intensity parameters of lock positions collected previously, on condition that the change between the third magnetic-field-intensity parameter at the lock position currently collected and the third magnetic-field-intensity parameter at the lock position previously collected is greater than a sixth threshold, and filter out the lock position currently collected and the third magnetic-field-intensity parameter currently collected on condition that one of the changes is less than the fifth threshold.

9. The door lock of claim 6, wherein the first magnetic-field-intensity parameter, the second magnetic-field-intensity parameter, and the third magnetic-field-intensity parameter each comprises three sub-parameters in three directions.

10. The door lock of claim 9, wherein in terms of recording the mapping relationship between the at least one ajar position collected and the at least one first magnetic-field-intensity parameter collected, the sensor is configured to:

obtain a change trend of the at least one first magnetic-field-intensity parameter during movement of the door in the ajar state from a first extreme position to a second extreme position; and for an ajar position collected, on condition that two or more of a first directional sub-parameter, a second directional sub-parameter, and a third directional sub-parameter of a first magnetic-field-intensity parameter corresponding to the ajar position collected are not satisfied with the change trend of the at least one first magnetic-field-intensity parameter, filter out the ajar position currently collected and the first magnetic-field-intensity parameter currently collected;

in terms of recording the mapping relationship between the plurality of open positions collected and the second magnetic-field-intensity parameters collected, the sensor is configured to:

obtain a change trend of the second magnetic-field-intensity parameters during movement of the door in the open state from a third extreme position to a fourth extreme position; and for an open position collected, on condition that two or more of a fourth directional sub-parameter, a fifth directional sub-parameter, and a sixth directional sub-parameter of a second magnetic-field-intensity parameter corresponding to the open position collected are not satisfied with the change trend of the second magnetic-field-intensity parameter, filter out the open position currently collected and the second magnetic-field-intensity parameter currently collected; and in terms of recording the mapping relationship between the at least one lock position collected and the at least one third magnetic-field-intensity parameter collected, the sensor is configured to:

obtain a change trend of the at least one third magnetic-field-intensity parameter during movement of the door in the locked state from a fifth extreme position to a sixth extreme position; and for a lock position collected, on condition that two or more of a seventh directional sub-parameter, an eighth directional sub-parameter, and a ninth directional sub-parameter of a third magnetic-field-intensity parameter corresponding to the lock position collected are not satisfied with the change trend of the at least one third magnetic-field-intensity parameter, filter out the lock position currently collected and the third magnetic-field-intensity parameter currently collected.

11. A non-transitory computer storage medium configured to store computer instructions which, when executed by a processor, are operable with the processor to implement:

collecting a first magnetic-field-intensity numerology at a position of a door in an ajar state, a second magnetic-field-intensity numerology at a position of the door in an open state, and a third magnetic-field-intensity numerology at a position of the door in a locked state; and transmitting to a database, a mapping relationship between the ajar state of the door and the first magnetic-field-intensity numerology, a mapping relationship between the open state of the door and the second magnetic-field-intensity numerology, and a mapping relationship between the locked state of the door and the third magnetic-field-intensity numerology;

wherein the first magnetic-field-intensity numerology contains at least one first magnetic-field-intensity parameter, and each of the at least one first magnetic-field-intensity parameter corresponds to an ajar position of the door in the ajar state;

the second magnetic-field-intensity numerology contains at least one second magnetic-field-intensity parameter, and each of the at least one second magnetic-field-intensity parameter corresponds to an open position of the door in the open state; and the third magnetic-field-intensity numerology contains at least one third magnetic-field-intensity parameter, and each of the at least one third magnetic-field-intensity parameter corresponds to a lock position of the door in the locked state;

wherein the computer instructions, when executed by a processor, are further operable with the processor to implement:

obtaining, by the sensor, a first validation magnetic-field-intensity parameter corresponding to the position of the door in the ajar state;

determining, by the sensor, whether the first validation magnetic-field-intensity parameter is in an interval ranging from a minimum first magnetic-field-intensity parameter in the first magnetic-field-intensity numerology to a maximum first magnetic-field-intensity parameter in the first magnetic-field-intensity numerology, and if no, collecting, by the sensor, first validation magnetic-field-intensity parameters that respectively correspond to a plurality of positions of the door in the ajar state, determining, by the sensor, first deviations by comparing the first validation magnetic-field-intensity parameters that correspond to the plurality of positions and first magnetic-field-intensity parameters in the first magnetic-field-intensity numerology respectively, and re-adjusting, by the sensor, each first magnetic-field-intensity parameter in the first magnetic-field-intensity numerology according to a corresponding first deviation;

obtaining, by the sensor, a second validation magnetic-field-intensity parameter corresponding to the position of the door in the open state;

determining, by the sensor, whether the second validation magnetic-field-intensity parameter is in an interval ranging from a minimum second magnetic-field-intensity parameter in the second magnetic-field-intensity numerology to a maximum second magnetic-field-intensity parameter in the second magnetic-field-intensity numerology, and if no, collecting, by the sensor, second validation magnetic-field-intensity parameters that respectively correspond to a plurality of positions of the door in the open state, determining, by the sensor, second deviations by comparing the second validation magnetic-field-intensity parameters that correspond to the plurality of positions and second magnetic-field-intensity parameters in the second magnetic-field-intensity numerology respectively, and re-adjusting, by the sensor, each second magnetic-field-intensity parameter in the second magnetic-field-intensity numerology according to a corresponding second deviation;

obtaining, by the sensor, a third validation magnetic-field-intensity parameter corresponding to the position of the door in the locked state; and determining, by the sensor, whether the third validation magnetic-field-intensity parameter is in an interval ranging from a minimum third magnetic-field-intensity parameter in the third magnetic-field-intensity numerology to a maximum third magnetic-field-intensity parameter in the third magnetic-field-intensity numerology, and if no, collecting, by the sensor, third validation magnetic-field-intensity parameters that respectively correspond to a plurality of positions of the door in the locked state, determining, by the sensor, third deviations by comparing the third validation magnetic-field-intensity parameters that correspond to the plurality of positions and third magnetic-field-intensity parameters in the third magnetic-field-intensity numerology respectively, and re-adjusting, by the sensor, each third magnetic-field-intensity parameter in the third magnetic-field-intensity numerology according to a corresponding third deviation.

12. The non-transitory computer storage medium of claim 11, wherein in terms of collecting the first magnetic-field-intensity numerology at the position of the door in the ajar state, the computer instructions, when executed by a processor, are operable with the processor to implement:

collecting at least one ajar position of the door in the ajar state from a first extreme position to a second extreme position and at least one first magnetic-field-intensity parameter corresponding to the at least one ajar position; and recording a mapping relationship between the at least one ajar position collected and the at least one first magnetic-field-intensity parameter collected, wherein the ajar state corresponds to only one ajar position on condition that the first extreme position and the second extreme position are a same ajar position;

in terms of collecting the second magnetic-field-intensity numerology at the position of the door in the open state, the computer instructions, when executed by a processor, are operable with the processor to implement:

collecting a plurality of open positions of the door in the open state from a third extreme position to a fourth extreme position and second magnetic-field-intensity parameters corresponding to the plurality of open positions; and recording a mapping relationship between the plurality of open positions collected and the second magnetic-field-intensity parameters collected; and in terms of collecting the third magnetic-field-intensity numerology at the position of the door in the locked state, the computer instructions, when executed by a processor, are operable with the processor to implement:

collecting at least one lock position of the door in the locked state from a fifth extreme position to a sixth extreme position and at least one third magnetic-field-intensity parameter corresponding to the at least one lock position; and recording a mapping relationship between the at least one lock position collected and the at least one third magnetic-field-intensity parameter collected, wherein the locked state corresponds to only one lock position on condition that the fifth extreme position and the sixth extreme position are a same lock position.

13. The non-transitory computer storage medium of claim 12, wherein in terms of recording the mapping relationship between the at least one ajar position collected and the at least one first magnetic-field-intensity parameter collected, the computer instructions, when executed by a processor, are operable with the processor to implement:

comparing a first magnetic-field-intensity parameter at an ajar position currently collected and a first magnetic-field-intensity parameter at an ajar position previously collected, on condition that the first extreme position and the second extreme position are different ajar positions;

filtering out the ajar position currently collected and the first magnetic-field-intensity parameter currently collected, on condition that a change between the first magnetic-field-intensity parameter at the ajar position currently collected and the first magnetic-field-intensity parameter at the ajar position previously collected is less than a first threshold; and obtaining changes by comparing the first magnetic-field-intensity parameter at the ajar position currently collected and first magnetic-field-intensity parameters of ajar positions collected previously, on condition that the change between the first magnetic-field-intensity parameter at the ajar position currently collected and the first magnetic-field-intensity parameter at the ajar position previously collected is greater than a second threshold, and filtering out the ajar position currently collected and the first magnetic-field-intensity parameter currently collected on condition that one of the changes is less than the first threshold;

in terms of recording the mapping relationship between the plurality of open positions collected and the second magnetic-field-intensity parameters collected, the computer instructions, when executed by a processor, are operable with the processor to implement:

comparing a second magnetic-field-intensity parameter at an open position currently collected and a second magnetic-field-intensity parameter at an open position previously collected;

filtering out the open position currently collected and the second magnetic-field-intensity parameter currently collected, on condition that a change between the second magnetic-field-intensity parameter at the open position currently collected and the second magnetic-field-intensity parameter at the open position previously collected is less than a third threshold;

obtaining changes by comparing the second magnetic-field-intensity parameter at the open position currently collected and second magnetic-field-intensity parameters of open positions collected previously, on condition that the change between the second magnetic-field-intensity parameter at the open position currently collected and the second magnetic-field-intensity parameter at the open position previously collected is greater than a fourth threshold, and filtering out the open position currently collected and the second magnetic-field-intensity parameter currently collected on condition that one of the changes is less than the third threshold;

in terms of recording the mapping relationship between the plurality of lock positions collected and the third magnetic-field-intensity parameters collected, the computer instructions, when executed by a processor, are operable with the processor to implement:

comparing a third magnetic-field-intensity parameter at a lock position currently collected and a third magnetic-field-intensity parameter at a lock position previously collected, on condition that the fifth extreme position and the sixth extreme position are different lock positions;

filtering out the lock position currently collected and the third magnetic-field-intensity parameter currently collected, on condition that a change between the third magnetic-field-intensity parameter at the lock position currently collected and the third magnetic-field-intensity parameter at the lock position previously collected is less than a fifth threshold; and obtaining changes by comparing the third magnetic-field-intensity parameter at the lock position currently collected and third magnetic-field-intensity parameters of lock positions collected previously, on condition that the change between the third magnetic-field-intensity parameter at the lock position currently collected and the third magnetic-field-intensity parameter at the lock position previously collected is greater than a sixth threshold, and filtering out the lock position currently collected and the third magnetic-field-intensity parameter currently collected on condition that one of the changes is less than the fifth threshold.

14. The non-transitory computer storage medium of claim 5, wherein the first magnetic-field-intensity parameter, the second magnetic-field-intensity parameter, and the third magnetic-field-intensity parameter each comprises three sub-parameters in three directions.

15. The non-transitory computer storage medium of claim 14, wherein in terms of recording the mapping relationship between the at least one ajar position collected and the at least one first magnetic-field-intensity parameter collected, the computer instructions, when executed by a processor, are operable with the processor to implement:

obtaining a change trend of the at least one first magnetic-field-intensity parameter during movement of the door in the ajar state from a first extreme position to a second extreme position; and for an ajar position collected, on condition that two or more of a first directional sub-parameter, a second directional sub-parameter, and a third directional sub-parameter of a first magnetic-field-intensity parameter corresponding to the ajar position collected are not satisfied with the change trend of the at least one first magnetic-field-intensity parameter, filtering out the ajar position currently collected and the first magnetic-field-intensity parameter currently collected;

in terms of recording the mapping relationship between the plurality of open positions collected and the second magnetic-field-intensity parameters collected, the computer instructions, when executed by a processor, are operable with the processor to implement:

obtaining a change trend of the second magnetic-field-intensity parameters during movement of the door in the open state from a third extreme position to a fourth extreme position; and for an open position collected, on condition that two or more of a fourth directional sub-parameter, a fifth directional sub-parameter, and a sixth directional sub-parameter of a second magnetic-field-intensity parameter corresponding to the open position collected are not satisfied with the change trend of the second magnetic-field-intensity parameter, filtering out the open position currently collected and the second magnetic-field-intensity parameter currently collected; and in terms of recording the mapping relationship between the at least one lock position collected and the at least one third magnetic-field-intensity parameter collected, the computer instructions, when executed by a processor, are operable with the processor to implement:

obtaining a change trend of the at least one third magnetic-field-intensity parameter during movement of the door in the locked state from a fifth extreme position to a sixth extreme position; and for a lock position collected, on condition that two or more of a seventh directional sub-parameter, an eighth directional sub-parameter, and a ninth directional sub-parameter of a third magnetic-field-intensity parameter corresponding to the lock position collected are not satisfied with the change trend of the at least one third magnetic-field-intensity parameter, filtering out the lock position currently collected and the third magnetic-field-intensity parameter currently collected.

* * * * *